United States Patent
Jain et al.

(10) Patent No.: US 10,521,246 B1
(45) Date of Patent: Dec. 31, 2019

(54) APPLICATION PROGRAMMING INTERFACE ENDPOINT ANALYSIS AND MODIFICATION

(71) Applicant: INTERNATIONAL BUSINESS MACHINES CORPORATION, Armonk, NY (US)

(72) Inventors: Anshu N. Jain, Sunnyvale, CA (US); Vineet Dhanawat, San Jose, CA (US); Pongsakorn Sukjunnimit, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/007,487

(22) Filed: Jun. 13, 2018

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/445* | (2018.01) |
| *G06F 9/54* | (2006.01) |
| *G06N 20/00* | (2019.01) |

(52) U.S. Cl.
CPC .......... *G06F 9/44526* (2013.01); *G06F 9/547* (2013.01); *G06N 20/00* (2019.01)

(58) Field of Classification Search
CPC .................................................. G06F 9/44526
USPC ........................................................ 719/328
See application file for complete search history.

(56) References Cited

U.S. PATENT DOCUMENTS

| | | | |
|---|---|---|---|
| 8,032,609 | B2 | 10/2011 | Rogers et al. |
| 8,543,552 | B2 | 9/2013 | Jain et al. |
| 8,832,175 | B2 | 9/2014 | du Preez et al. |
| 2011/0107241 | A1 | 5/2011 | Moore |
| 2013/0159826 | A1 | 6/2013 | Mason et al. |
| 2014/0033170 | A1 | 1/2014 | Nimashakavi et al. |
| 2014/0046879 | A1* | 2/2014 | MacLennan .......... G06N 20/00 706/12 |
| 2015/0365460 | A1 | 12/2015 | Miller |

OTHER PUBLICATIONS

T. Ball, E. Bounimova, B. Cook, V. Levin, J. Lichtenberg, C. McGarvey, B. Ondrusek, S. K. Rajamani, and A. Ustuner, "Thorough static analysis of device drivers," ACM SIGOPS Operating Systems Review 40, No. 4 (2006): 73-85. Retrieved from Internet using: https://cs.uwaterloo.ca/~Brecht/courses/702/Possible-Readings/device-drivers/static-mal-device-drivers-eurosys-2006.pdf.

(Continued)

*Primary Examiner* — Timothy A Mudrick
(74) *Attorney, Agent, or Firm* — Conley Rose, P.C.

(57) ABSTRACT

In an example, a computer program product comprising a computer readable storage medium having program instructions embodied therewith, the program instructions executable by a processor to cause the processor to access an application programming interface (API) endpoint, log the access of the API endpoint in an API usage log, analyze the API usage log to determine characteristics associated with the API endpoint, de-parameterize the API endpoint according to the analysis of the API usage log to generate a modified API endpoint, generate a mapping of the modified API endpoint to the API endpoint, and implement the modified API endpoint in a software application.

20 Claims, 9 Drawing Sheets

(56) References Cited

OTHER PUBLICATIONS

R. Dooley, M. Vaughn, D. Stanzione, S. Terry, and E. Skidmore, "Software-as-a-service: the iPlant foundation API," In 5th IEEE Workshop on Many-Task Computing on Grids and Supercomputers (MTAGS). 2012. Retrieved from Internet using: http://ai2-s2-pdfs.s3.amazonaws.com/ccde/19b95773dbb55328f3269fa697a4a7d60e03.pdf, 8 pages.

C. Zhang, J. Yang, Y. Zhang, J. Fan, X. Zhang, J. Zhao, and P. Ou, "Automatic parameter recommendation for practical API usage," In Proceedings of the 34th International Conference on Software Engineering, pp. 826-836. IEEE Press, 2012. Retrieved from Internet using: http://stap.sjtu.edu.cn/iimages/archive/f/f0/20130503073026!Precise_icse2012.pdf.

* cited by examiner

US 10,521,246 B1

APPLICATION PROGRAMMING INTERFACE ENDPOINT ANALYSIS AND MODIFICATION

BACKGROUND

The present disclosure relates to the field of computer programming, and more specifically to software development tools.

An application programming interface (API) is a set of tools that facilitate building software applications by defining forms of communication between sub-components of the software application or between software applications. In this sense, an API may be considered the building blocks for building a software application. Routines, subroutines, protocols, data structures, objects or object classes, variable, remote calls, or other methods or operations included in the API may be accessed via an endpoint, sometimes implemented as, or represented by, a uniform resource locator (URL) or a uniform resource indicator (URI).

SUMMARY

According to an embodiment of the present disclosure, a computer program product is described. Some examples of the computer program product comprises a computer readable storage medium having program instructions embodied therewith, the program instructions executable by a processor to cause the processor to access an API endpoint, log the access of the API endpoint in an API usage log, analyze the API usage log to determine characteristics associated with the API endpoint, de-parameterize the API endpoint according to the analysis of the API usage log to generate a modified API endpoint, generate a mapping of the modified API endpoint to the API endpoint, and implement the modified API endpoint in a software application.

According to another embodiment of the present disclosure, a computer-implemented method is described. Some examples of the computer-implemented method include accessing an API endpoint, logging the access of the API endpoint in an API usage log, analyzing the API usage log to determine characteristics associated with the API endpoint, de-parameterizing the API endpoint according to the analysis of the API usage log to generate a modified API endpoint, generating a mapping of the modified API endpoint to the API endpoint, and implementing the modified API endpoint in a software application.

According to another embodiment of the present disclosure, a system is described. Some examples of the system include a server comprising a processor configured to access an electronic resource via an API endpoint, a data store coupled to the server and configured to log electronic resource accesses made by the server utilizing API endpoints, a log analyzer coupled to the data store and configured to analyze a API usage log of the data store to determine characteristics associated with the API endpoints, an API modification candidate generator coupled to the log analyzer and configured to de-parameterize the API endpoint according to the analysis of the API usage log to generate a modified API endpoint, and a mapping generator coupled to the API modification candidate generator and the server and configured to generate a mapping of the modified API endpoint to the API endpoint. In some examples, the server is further configured to, via the processor, implement the modified API endpoint in a software application.

DETAILED DESCRIPTION

As cross-platform compatibility of software applications increases in focus, efforts to genericize APIs to provide for domain agnostic application development frameworks also increase. As API endpoints are genericized, the endpoints often increase in length and become less user-friendly to developers who may try to understand the APIs and endpoints so that the developers may implement the APIs using the endpoints. One way in which the endpoints increase in length and complexity is the addition of filters to the endpoints to facilitate the genericizing of the endpoints. Filters are a way in which one or more parameters are added to an endpoint to further define and narrow implementation of that endpoint and/or pass the parameter to a target of the endpoint for further data retrieval or other operations. As the endpoints become more generic, they may pose an obstacle to developers creating software applications due to the length and complexity of the endpoints.

Disclosed herein are embodiments that provide for automatic de-parameterization of API endpoints based on frequency of use of the API endpoints. In at least some examples, frequency of use of an endpoint is determined according to a statistical hit ratio of a cache eviction algorithm, based on a full URI of the API endpoint, based on parameters of the API endpoint, based on masks applied to parameters of the API endpoint and compared to determine URI similarity, or any combination of the foregoing. In other examples, a user specifies parameters for de-parameterization without regard to frequency of use of the API endpoint. In at least some examples, a mapping is generated between an original API endpoint and a generated de-parameterized API endpoint (e.g., a domain-specific API endpoint). In at least some other examples, API endpoints are discovered for de-parameterization based on a schedule (e.g., periodically), based on a defined triggering event, manually, through a machine learning process, or any combination of the foregoing.

Figure 1:
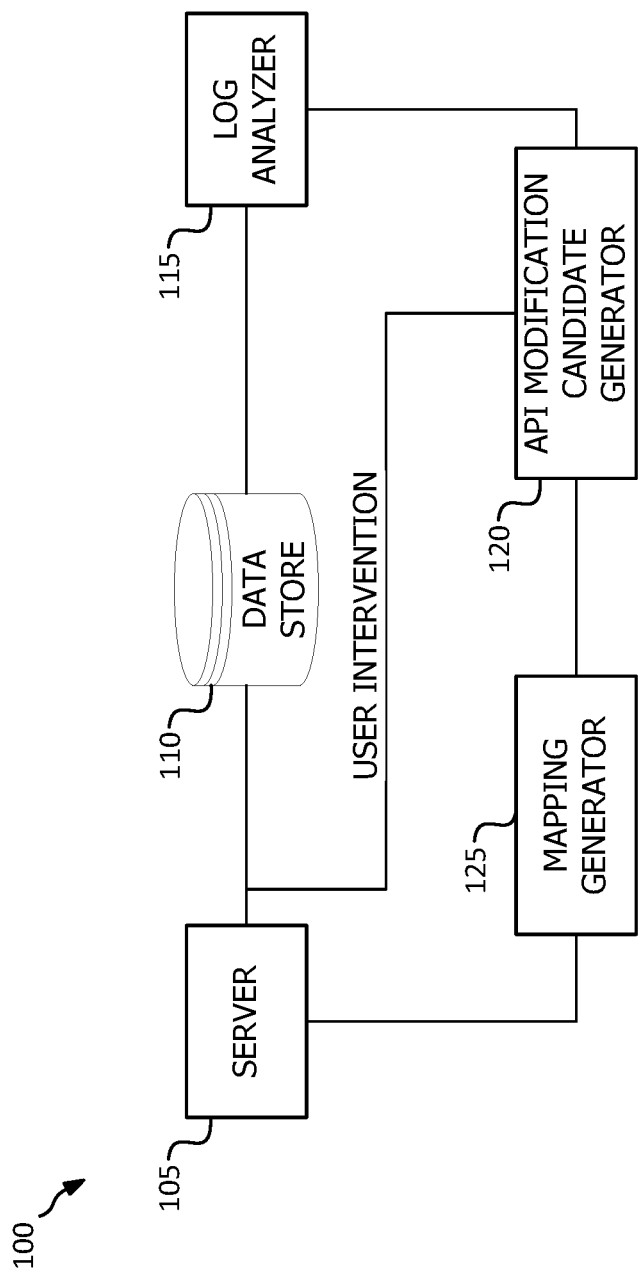
FIG. 1 is a block diagram of an illustrative API de-parameterization system in accordance with various embodiments.

Referring now to FIG. 1, a block diagram of an illustrative API de-parameterization system 100 in accordance with various embodiments is shown. The system 100, in at least some examples, is implemented to perform de-parameterization of API endpoints (sometimes referred to as generic API endpoints). The system 100 may be implemented as a single device having multiple sub-components, or may be implemented as multiple devices configured to communicatively couple together to provide the functionality of the system 100 as described herein. In at least some examples, any one or more components of the system 100 are implemented by one or more computing devices to provide the functionality of the system 100 as described herein.

In one embodiment, the system 100 includes a server 105, a data store 110, a log analyzer 115, an API modification candidate generator 120, and a mapping generator 125. In some examples, any one or more of the data store 110, the log analyzer 115, the API modification candidate generator 120, and/or the mapping generator 125 may be implemented as components of the server 105, or any one or more of the data store 110, the log analyzer 115, the API modification candidate generator 120, and/or the mapping generator 125 may be implemented as components of any one or more other servers or devices (not shown). In some examples, the data store 110 is communicatively coupled to the server 105 and configured to receive and store API usage logs from the server 105. The API usage logs describe, for example, API usage history including accessed APIs (such as accessed or utilized API endpoints), frequency of use, and any one or more other API usage history characteristics. The log analyzer 115 is communicatively coupled to the data store 110 and configured to analyze the API usage logs to determine API usage frequency, API usage patterns, or any other suitable API usage characteristics according to the API usage history of the API usage logs. In at least some examples, the log analyzer 115 implements one or more machine learning processes or algorithms to determine the API usage frequency, API usage patterns, or other suitable API usage characteristics, as is discussed in greater detail below. The API modification candidate generator 120 is communicatively coupled to the log analyzer 115 and configured to generate a modified endpoint based on the analyses performed by the log analyzer 115. For example, based on the analyses performed by the log analyzer 115, the API modification candidate generator 120 generates a modified API endpoint (sometimes referred to as a specific API endpoint).

Figure 2:
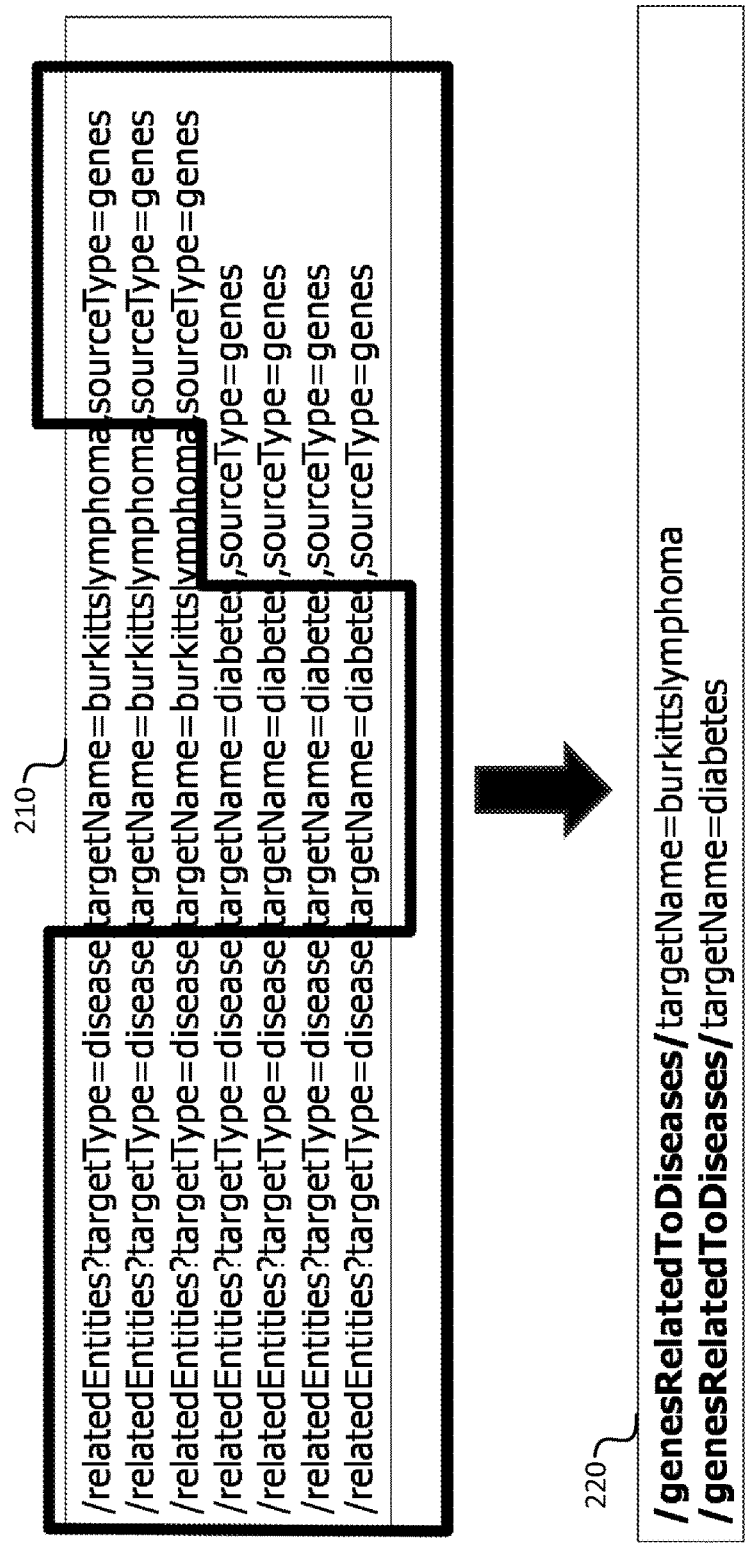
FIG. 2 is a table illustrating a partial API usage log in accordance with various embodiments.

The modified API endpoint is generated, in various examples, by creating a shortened version of API endpoints indicated in the API usage logs that are accessed frequently and/or have certain characteristics, parameters, and/or values in common. In various examples, the modified API endpoint is generated according to the first letter of each keyword (e.g., parameter) in the API endpoint, a last full keyword in the API endpoint, or any other suitable logic or determining factor that results in shortened, easy to understand modified API endpoints. For example, as shown in FIG. 2, when the log analyzer 115 identifies a pattern in the API endpoints of the API usage log, the API modification candidate generator 120 generates modified API endpoints according to the identified pattern that shorten the API endpoints to, in some examples, facilitate more efficient use and reduced computing resource consumption. As shown in FIG. 2, when the log analyzer 115 identifies a pattern in the API endpoints of the API usage log 210, such as a plurality of API endpoints exceeding a threshold appearing in the API usage log 210 and sharing a target type, target name, and source type, the API modification candidate generator 120 generates modified API endpoints 220. One example of an identified pattern is enclosed with bold outlining in FIG. 2. The modified API endpoints 220, in some examples, include at least a portion of the API endpoints (e.g., as appearing prior to modification) such as the target name, combined with a new element that summarizes at least a portion of the API endpoints that is omitted from explicit recitation in the modified API endpoints 220. While illustrated for the sake of simplicity as including seven entries, the API usage log 210 may include any number of entries, each including any suitable content and occurring in any order (e.g., such that similar entries may not necessarily appear in consecutive order as shown in FIG. 2). Furthermore, while certain forms of modified API endpoints 220 are illustrated in FIG. 2 for the sake of clarity of understanding, the present disclosure is not limited to this particular form of modified API endpoint and any suitable modified API endpoint generated at least partially according to contents of the API usage log 210 are included within the scope of the present disclosure.

Returning now to FIG. 1, in some examples, the API modification candidate generator 120 is further communicatively coupled to the server 105. In such examples, a user may provide one or more inputs, such as using a user interface and/or input devices of the server 105, to specify one or more parameters for use in generating the modified API endpoints. For example, the user may provide inputs directly to the API modification candidate generator 120 indicating one or more API endpoints for modification to form the modified API endpoints. Additionally, or alternatively, the user may provide inputs indicating one or more parameters for use in forming the modified API endpoints (e.g., such as portions of the API endpoints to retain in the modified API endpoints, portions of the API endpoints to genericize in the modified API endpoints, and/or portions of the API endpoints to discard in the modified API endpoints). In such examples, one or more of the data store 110 or the log analyzer 115 may be bypassed in generating the modified API endpoints. In some examples, the user provides the input when the system 100 is first initialized, turned on, reset, or otherwise controlled such that no API usage information is available for analysis by the log analyzer 115.

Figure 3:
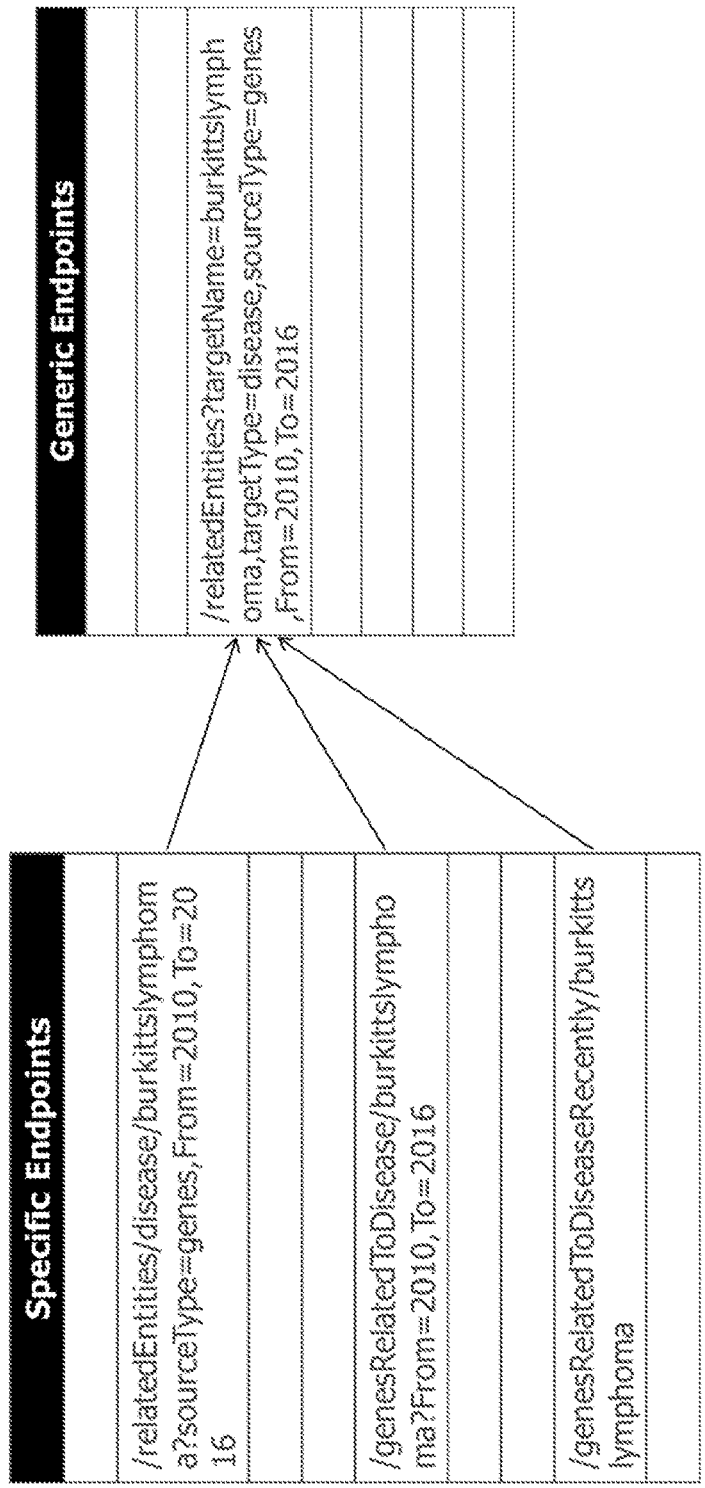
FIG. 3 is a table illustrating API endpoint mapping in accordance with various embodiments.

The API modification candidate generator 120 provides the modified API endpoints to the mapping generator 125. In at least some examples, the API modification candidate generator 120 further provides the API endpoints upon which the modified API endpoints are based to the mapping generator 125. The mapping generator 125, in some examples, generates and stores a mapping between the modified API endpoints and the API endpoints. An example mapping between modified API endpoints (e.g., specific API endpoints) and API endpoints (e.g., generic API endpoints) is shown in FIG. 3. As illustrated in FIG. 3, an API endpoint may have any number of modified API endpoints mapped to the API endpoint, where each of the modified API endpoints may have varying degrees of specificity and include any number of parameters. For example, a previously modified API endpoint may be modified a second time to further shorten and simplify the modified API endpoint, and both the originally modified and newly modified API endpoints may be mapped to the same API endpoint. Furthermore, while certain forms of API endpoints and modified API endpoints are illustrated in FIG. 3 for the sake of clarity of understanding, the present disclosure is not limited to these particular forms of API endpoints or modified API endpoints and any suitable API endpoints or modified API endpoints generated at least partially according to the teachings of this disclosure are included within the scope of the present disclosure.

Returning now to FIG. 1, in at least some examples the mapping generator 125 provides the modified API endpoints to the server 105. In some examples, the mapping generator 125 further provides the mapping of the modified API endpoints (e.g., the specific API endpoints) and the API endpoints (e.g., the generic API endpoints), as shown in FIG. 3, to the server 105. The mapping generator 125 provides the modified API endpoints and/or the mapping to the server 105, in at least some examples, to facilitate access by the server 105 of electronic resources described and/or identified by the modified API endpoints and/or to facilitate use of the modified API endpoints in generating one or more software applications. For example, when the server 105 has received the mapping and the server 105 subsequently receives a request for access to an electronic resource described and/or identified by a received specific API endpoint, the server 105 matches the received specific API endpoint to a generic API endpoint indicated in the mapping. Based on the matching, the server 105 provides access to the electronic resource described and/or identified by the received specific API endpoint by accessing the electronic resource via the generic API endpoint. In at least some examples, the server 105 provides the access based on matching the received specific API endpoint to the generic API endpoint in a manner transparent to an end user and/or a software developer who developed a software application that generated and/or transmitted the request for access to the electronic resource described and/or identified by the received specific API endpoint. In some examples, the system 100 includes an approval mechanism (not shown) positioned between the mapping generator 125 and the server 105 such that a modified API endpoint and/or mapping is reviewed for approval or discarding after generation and before providing to the server 105. The reviewing may be performed by a user or by an automated system that checks the modified API endpoint and/or the mapping against one or more rules for approval.

In another example, when the server 105 has received the modified API endpoint (and/or the mapping), the server 105 provides the modified API endpoint to a software developer for use in developing (e.g., generating) a software application. The modified API endpoint may be provided in any suitable manner, such as an element of an API library that includes a plurality of API endpoints and/or modified API endpoints. In various examples, the software developer utilizes the modified API endpoint in a manner substantially similar to the API endpoint and obtains access to substantially the same electronic resources using the modified API endpoint as would be accessed using the API endpoint. For example, the software developer may include the modified API in a software application being generated by the software developer such that, upon execution, the modified API causes the software application to perform one or more functions, request access to one or more electronic resources, receive one or more electronic resources, etc. In at least some examples, any one or more of the API endpoint, the modified API endpoint, or the mapping are included and individually usable in an API library of the software application.

Figure 4:
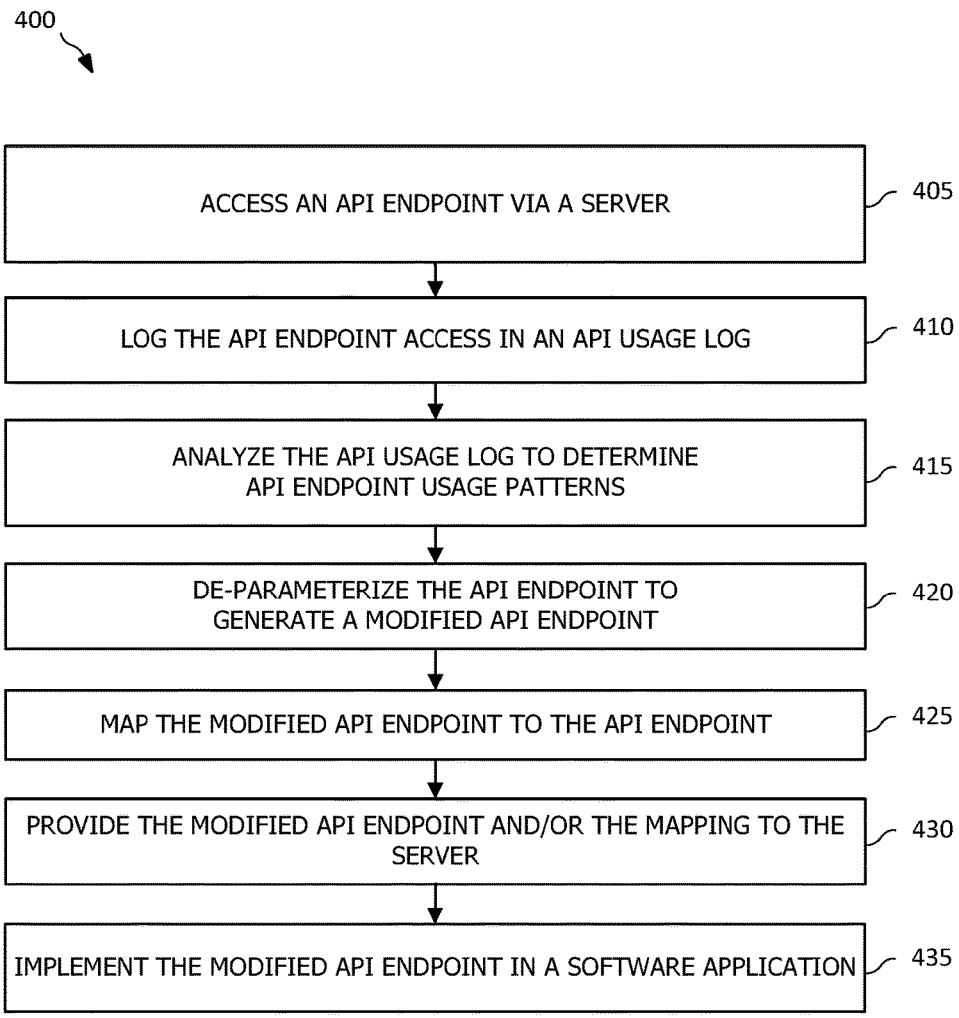
FIG. 4 is a flowchart of an illustrative method of pattern-based API endpoint de-parameterization in accordance with various embodiments.

Referring now to FIG. 4, a flowchart of an illustrative method 400 of pattern-based API endpoint de-parameterization in accordance with various embodiments is shown. The method 400 is implemented, in at least one example, by the system 100 of FIG. 1 to identify API endpoint patterns in an API usage log and generate modified API endpoints. For example, the server 105 implementing any one or more of the data store 110, the log analyzer 115, the API modification candidate generator 120, and/or the mapping generator 125 may implement the method 400. In another example, the server 105 and any one or more other systems or devices including, or implementing, any one or more of the data store 110, the log analyzer 115, the API modification candidate generator 120, and/or the mapping generator 125 may implement the method 400.

At operation 405, a server accesses an API endpoint (e.g., a generic API endpoint). While described herein as a server for the sake of consistency and simplicity, the API endpoint may be accessed by any computing device and is not limited only to access by a server. In some examples, the server accesses the API endpoint responsive to execution of a software application on or by the server. In other examples, the server accesses the API endpoint responsive to receiving a request from a software application executed on or by another computing device. At operation 410, the server's access of the API endpoint is logged in an API usage log. The API usage log is stored, in some examples, in a data store that is external to the server. In other examples, the data store is a part of the server.

At operation 415, the API usage log is analyzed to determine API endpoint usage patterns. The API usage patterns may be defined according to one or more rules. For example, the API usage patterns may be defined according to a total number of API endpoint accesses for the same API endpoint, a number of API endpoint accesses for the same API endpoint during a given time period, a total number of API endpoint accesses for API endpoints having a number of parameters in common that exceeds a threshold number, a number of API endpoint accesses for API endpoints having a number of parameters in common that exceeds a threshold number during a given time period, and/or any one or more other suitable criteria. In at least some examples, the API usage patterns are identified according to a machine learning process that adapts to and/or learns based on one or more criteria. In one example, the machine learning process may learn which modified API endpoints are accessed more often than other modified API endpoints and modified analysis of the API usage log according to this learning.

At operation 420, the API endpoints are de-parameterized to generate modified (e.g., specific) API endpoints. The API endpoints are de-parameterized, in one example, by an API modification candidate generator that generates the modified API based at least partially on a result of the analysis of the API usage log. In some examples, the API modification candidate generator further generates the modified API according to a machine learning process. For example, the machine learning process may learn which type of de-parameterization, which parameter types, and/or which modified API endpoint length results in an increased number of accesses utilizing a respective modified API endpoint as opposed to other modified API endpoints. Based at least partially on this learning, the API modification candidate generator may generate new modified API endpoints. The API modification candidate generator generates the modified API endpoints, in some examples, by removing at least some parameters of an API endpoint (e.g., from a query portion of the API endpoint) and converting those parameters to portions of a path portion of the modified API endpoint.

At operation 425, the modified API endpoint is mapped to the API endpoint. In at least some examples, a plurality of modified API endpoints are mapped to a single API endpoint, where each of the plurality of modified API endpoints has a different degree of specificity (e.g., fewer parameters in a query portion of the modified API endpoint and an increased number of parameters in a path portion of the modified API endpoint). The mapping, in at least some examples, enables a device to translate between the modified API endpoint and the API endpoint to generate and/or service requests based on the modified API endpoint.

At operation 430, the modified API endpoint and/or the mapping are provided to the server for subsequent use. In some examples, the server stores the modified API endpoint and/or the mapping locally or remotely, while in other examples the server incorporates the modified API endpoint and/or the mapping into a software application being generated on, or by, the server. At operation 435, the modified API endpoint is implemented in a software application and an electronic resource remote to the server is accessed via execution of the modified API endpoint. For example, when the server has received the mapping and the server subsequently receives a request for access to an electronic resource described and/or identified by a modified API endpoint sent by a software application incorporating the modified API endpoint, the server matches the modified API endpoint to a generic API endpoint indicated in the mapping. Based on the matching, the server provides access to the electronic resource described and/or identified by the modified API endpoint by accessing the electronic resource via the API endpoint included in the mapping. In at least some examples, the server provides the access based on matching the modified API endpoint to the API endpoint in a manner transparent to an end user and/or a software developer who developed the software application that generated and/or transmitted the request for access to the electronic resource described and/or identified by the modified API endpoint. Similarly, when the server has received the modified API endpoint (and/or the mapping), the server provides the modified API endpoint to a software developer for use in developing (e.g., generating) a software application. The modified API endpoint may be provided in any suitable manner, such as an element of an API library that includes a plurality of API endpoints and/or modified API endpoints. In various examples, the software developer utilizes the modified API endpoint in a manner substantially similar to the API endpoint and obtains access to substantially the same electronic resources using the modified API endpoint as would be accessed using the API endpoint. For example, the software developer may include the modified API in a software application being generated by the software developer such that, upon execution, the modified API causes the software application to perform one or more functions, request access to one or more electronic resources, receive one or more electronic resources, etc. In at least some examples, any one or more of the API endpoint, the modified API endpoint, or the mapping are included and individually usable in an API library of the software application.

Figure 5:
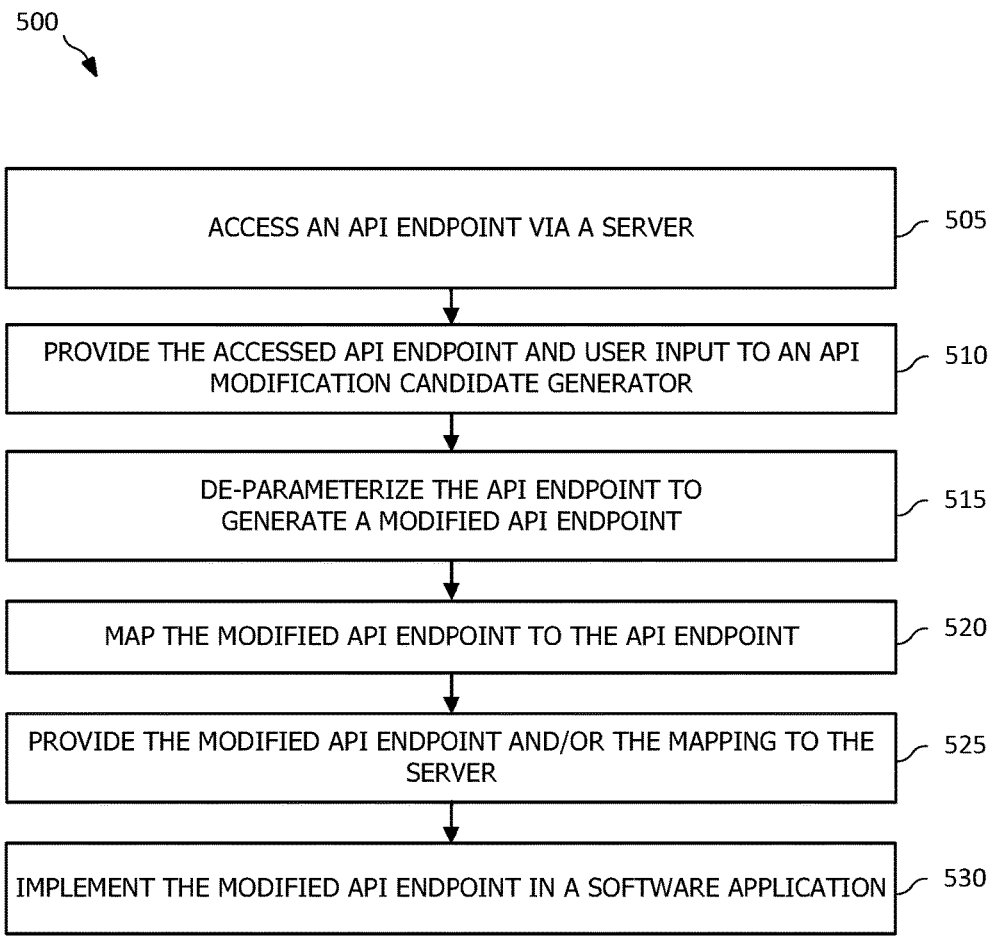
FIG. 5 is a flowchart of an illustrative method of inter-active API endpoint de-parameterization in accordance with various embodiments.

Referring now to FIG. 5, a flowchart of an illustrative method 500 of interactive API endpoint de-parameterization in accordance with various embodiments is shown. The method 500 is implemented, in at least one example, by the system 100 of FIG. 1 when a user specifies one or more inputs for use in de-parameterization of an API endpoint to form a modified API endpoint.

At operation 505, a server accesses an API endpoint (e.g., a generic API endpoint). While described herein as a server for the sake of consistency and simplicity, the API endpoint may be accessed by any computing device and is not limited only to access by a server. In some examples, the server accesses the API endpoint responsive to execution of a software application on or by the server. In other examples, the server accesses the API endpoint responsive to receiving a request from a software application executed on or by another computing device.

At operation 510, the API endpoint and a user input are provided to an API modification candidate generator. At operation 515, the API endpoints are de-parameterized by the API modification candidate generator to generate modified (e.g., specific) API endpoints. The API endpoints are de-parameterized, in one example, by the API modification candidate generator generating the modified API based at least partially on the received user input. For example, the user input may indicate a parameter of a query portion of the API endpoint to convert to a parameter of a path portion of the modified API endpoint, a parameter of a query portion of the API endpoint to include as a parameter of a query portion of the modified API endpoint, a parameter of a query portion of the API endpoint to omit from the modified API endpoint, or any other suitable user input specifying a desired format or parameter for consideration in generating the modified API endpoint. In some examples, the API modification candidate generator further generates the modified API according to a machine learning process, such as described above with respect to operation 420 of method 400 of FIG. 4.

At operation 520, the modified API endpoint is mapped to the API endpoint. Operation 520 is performed in a manner substantially similar to operation 425 of method 400 of FIG. 4, the description of which is not repeated herein. At operation 525, the modified API endpoint and/or the mapping are provided to the server for subsequent use. Operation 525 is performed in a manner substantially similar to operation 430 of method 400 of FIG. 4, the description of which is not repeated herein. At operation 530, the modified API endpoint is implemented in a software application and an electronic resource remote to the server is accessed via execution of the modified API endpoint. Operation 530 is performed in a manner substantially similar to operation 435 of method 400 of FIG. 4, the description of which is not repeated herein.

Figure 6:
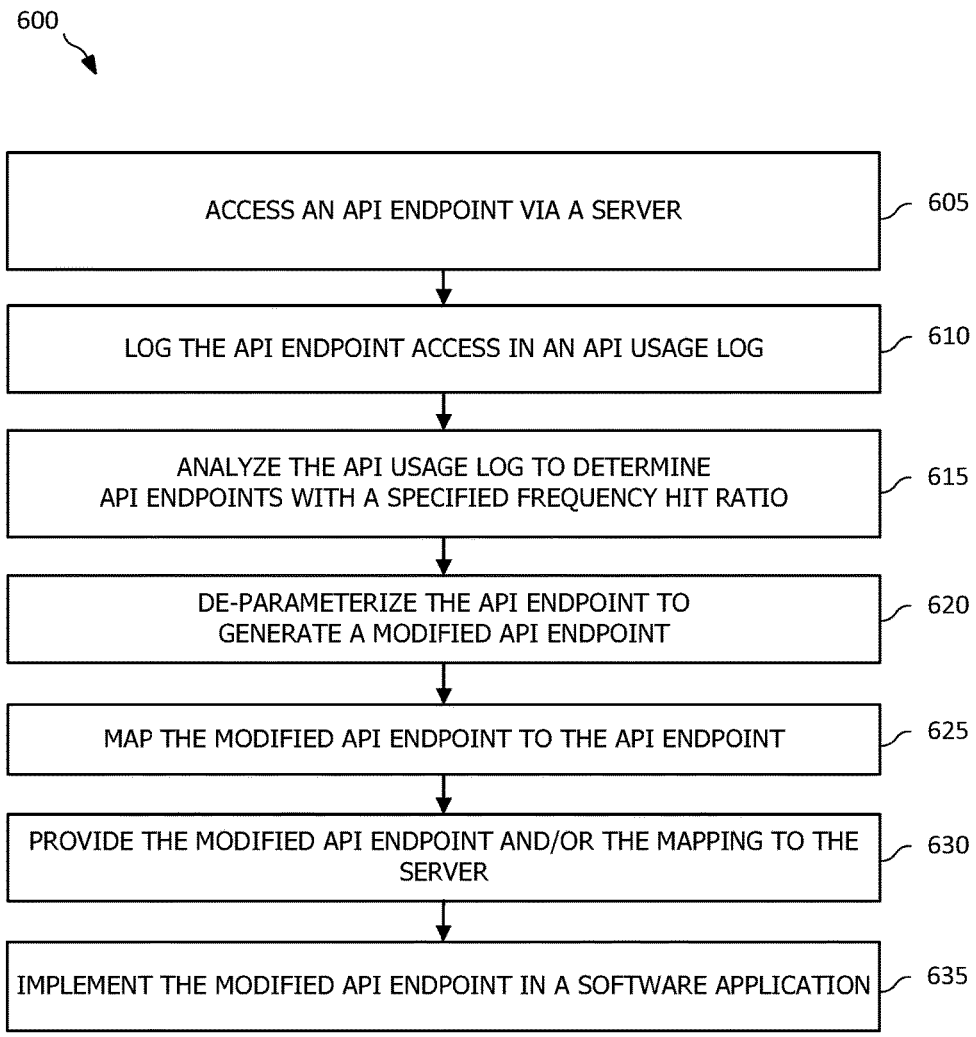
FIG. 6 is a flowchart of an illustrative method of frequency-based API endpoint de-parameterization in accordance with various embodiments.

Referring now to FIG. 6, a flowchart of an illustrative method 600 of frequency-based API endpoint de-parameterization in accordance with various embodiments is shown. The method 600 is implemented, in at least one example, by the system 100 of FIG. 1 to discover API endpoints suitable for de-parameterization to form modified API endpoints.

At operation 605, a server accesses an API endpoint (e.g., a generic API endpoint). While described herein as a server for the sake of consistency and simplicity, the API endpoint may be accessed by any computing device and is not limited only to access by a server. In some examples, the server accesses the API endpoint responsive to execution of a software application on or by the server. In other examples, the server accesses the API endpoint responsive to receiving a request from a software application executed on or by another computing device. At operation 610, the server's access of the API endpoint is logged in an API usage log. The API usage log is stored, in some examples, in a data store that is external to the server. In other examples, the data store is a part of the server.

At operation 615, the API usage log is analyzed to determine API endpoints in the API usage log with specified frequency hit ratio. In various examples, a frequency hit algorithm used in determining the frequency hit ratio may be a maximum hit ratio, most recently used, round-robin, or any other suitable programmable criteria. The analysis, in at least some examples, identifies API endpoints that are most optimal for modification. In some examples, the API usage log is analyzed according to a machine learning process, such as described above with respect to operation 415 of method 400 of FIG. 4 and not repeated herein.

At operation 620, the API endpoints are de-parameterized to generate modified (e.g., specific) API endpoints. Operation 620 is performed in a manner substantially similar to operation 420 of method 400 of FIG. 4, the description of which is not repeated herein. At operation 625, the modified API endpoint is mapped to the API endpoint. Operation 625 is performed in a manner substantially similar to operation 425 of method 400 of FIG. 4, the description of which is not repeated herein. At operation 630, the modified API endpoint and/or the mapping are provided to the server for subsequent use. Operation 630 is performed in a manner substantially similar to operation 430 of method 400 of FIG. 4, the description of which is not repeated herein. At operation 635, the modified API endpoint is implemented in a software application and an electronic resource remote to the server is accessed via execution of the modified API endpoint. Operation 635 is performed in a manner substantially similar to operation 435 of method 400 of FIG. 4, the description of which is not repeated herein.

Figure 7:
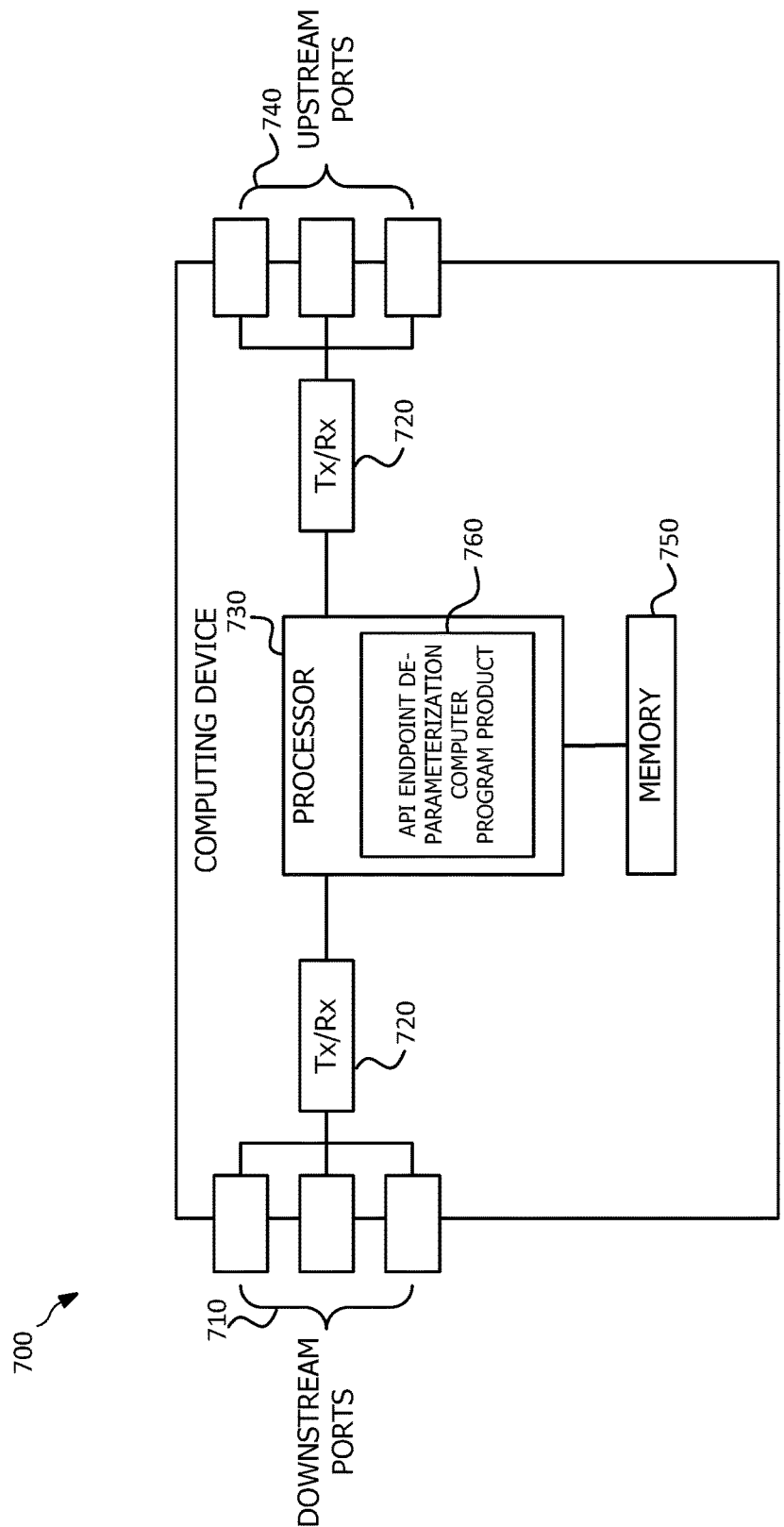
FIG. 7 depicts a computing device in accordance with various embodiments.

Referring now to FIG. 7, a schematic diagram of a computing device 700 according to various embodiments is shown. Computing device 700 may be any suitable processing device capable of performing the functions disclosed herein such as a computer system, a server, a computing resource, a cloud-computing node, a cognitive computing system, etc. Computing device 700 is configured to implement at least some of the features/methods disclosed herein, for example, the API endpoint de-parameterization, such as described above with respect to system 100, method 400, method 500, and/or method 600. For example, the computing device 700 may be, or may implement, any one or more of the server 105, data store 110, log analyzer 115, API modification candidate generator 120, and/or mapping generator 125. In various embodiments, for instance, the features/methods of this disclosure are implemented using hardware, firmware, and/or software (e.g., such as software modules) installed to run on hardware. In some embodiments, the software may utilize one or more software development kits (SDKs) or SDK functions to perform at least some of the features/methods of this disclosure.

Computing device 700 is a device (e.g., a computer system, a server, a computing resource, a cloud-computing node, a cognitive computing system, a machine learning platform, etc.) that accesses and/or de-parameterizes API endpoints, such as to form modified (e.g., specific) API endpoints. The computing device 700 may be an all-in-one device that performs each of the aforementioned operations, or the computing device may be a node that performs any one or more, or portion of one or more, of the aforementioned operations. In one embodiment, the computing device 700 is an apparatus and/or system configured to provide the API endpoint de-parameterization as described with respect to system 100, method 400, method 500, and/or method 600, for example, according to a computer program product executed on, or by, at least one processor.

The computing device 700 comprises one or more input devices 710. Some of the input devices 710 may be microphones, keyboards, touchscreens, buttons, toggle switches, cameras, sensors, and/or other devices that allow a user to interact with, and provide input to, the computing device 700. Some other of the input devices 710 may be downstream ports coupled to a transceiver (Tx/Rx) 720, which are transmitters, receivers, or combinations thereof. The Tx/Rx 720 transmits and/or receives data to and/or from other computing devices via at least some of the input devices 710. Similarly, the computing device 700 comprises a plurality of output devices 740. Some of the output devices 740 may be speakers, a display screen (which may also be an input device such as a touchscreen), lights, or any other device that allows a user to interact with, and receive output from, the computing device 700. At least some of the output devices 740 may be upstream ports coupled to another Tx/Rx 720, wherein the Tx/Rx 720 transmits and/or receives data from other nodes via the upstream ports. The downstream ports and/or the upstream ports may include electrical and/or optical transmitting and/or receiving components. In another embodiment, the computing device 700 comprises one or more antennas (not shown) coupled to the Tx/Rx 720. The Tx/Rx 720 transmits and/or receives data from other computing or storage devices wirelessly via the one or more antennas. In yet other embodiments, the computing device 700 may include additional Tx/Rx 720 such that the computing device 700 has multiple networking or communication interfaces, for example, such that the computing device 700 may communicate with a first device using a first communication interface (e.g., such as via the Internet) and may communicate with a second device using a second communication interface (e.g., such as another computing device 700 without using the Internet).

A processor 730 is coupled to the Tx/Rx 720 and at least some of the input devices 710 and/or output devices 740 and is configured to implement the API endpoint de-parameterization. In an embodiment, the processor 730 comprises one or more multi-core processors and/or memory modules 750, which functions as data stores, buffers, etc. The processor 730 is implemented as a general processor or as part of one or more application specific integrated circuits (ASICs), field-programmable gate arrays (FPGAs), and/or digital signal processors (DSPs). Although illustrated as a single processor, the processor 730 is not so limited and alternatively comprises multiple processors. The processor 730 further comprises processing logic configured to execute an API endpoint de-parameterization computer program product 760 that is configured to implement the API endpoint de-parameterization as described above with respect to system 100, method 400, method 500, and/or method 600.

FIG. 7 also illustrates that a memory module 750 is coupled to the processor 730 and is a non-transitory medium configured to store various types of data. Memory module 750 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 750 may be used to house the instructions for carrying out the various embodiments described herein. For example, the memory module 750 may comprise the API endpoint de-parameterization computer program product 760, which is executed by processor 730.

It is understood that by programming and/or loading executable instructions onto the computing device 700, at least one of the processor 730 and/or the memory module 750 are changed, transforming the computing device 700 in part into a particular machine or apparatus, for example, an API endpoint de-parameterization system having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
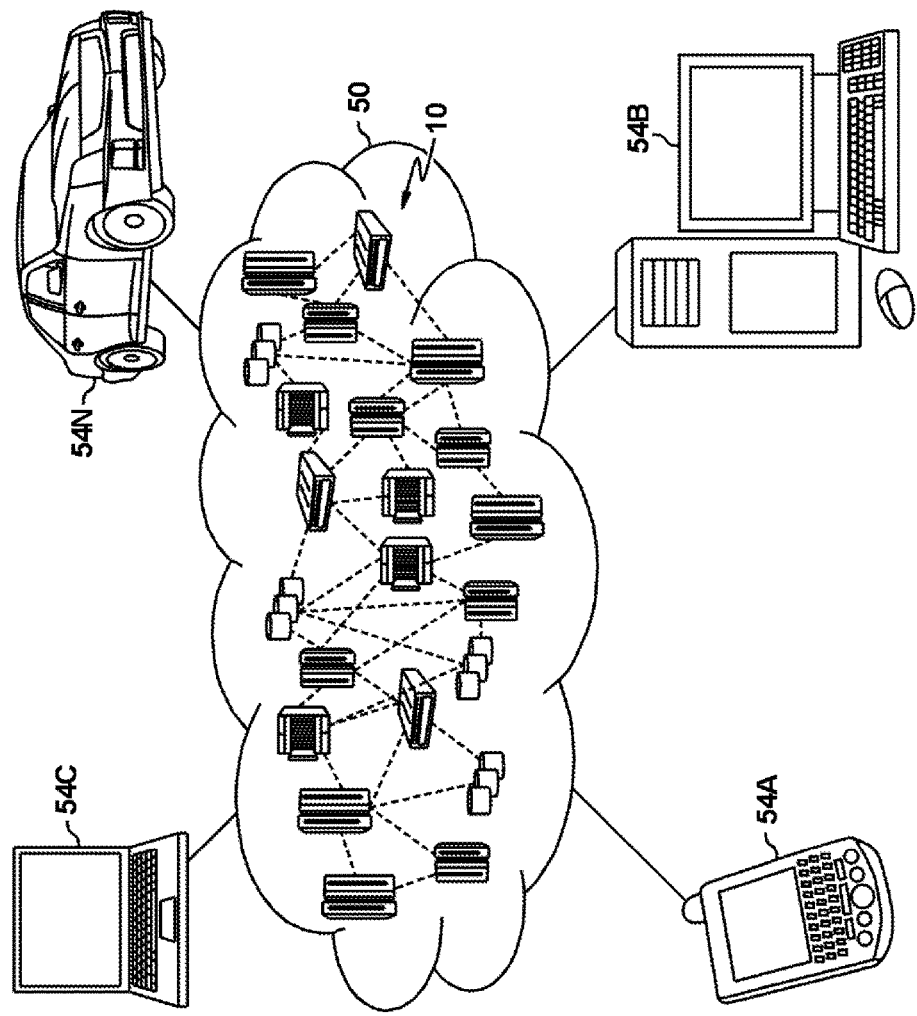
FIG. 8 depicts a cloud computing environment according to various embodiments.
Figure 9:
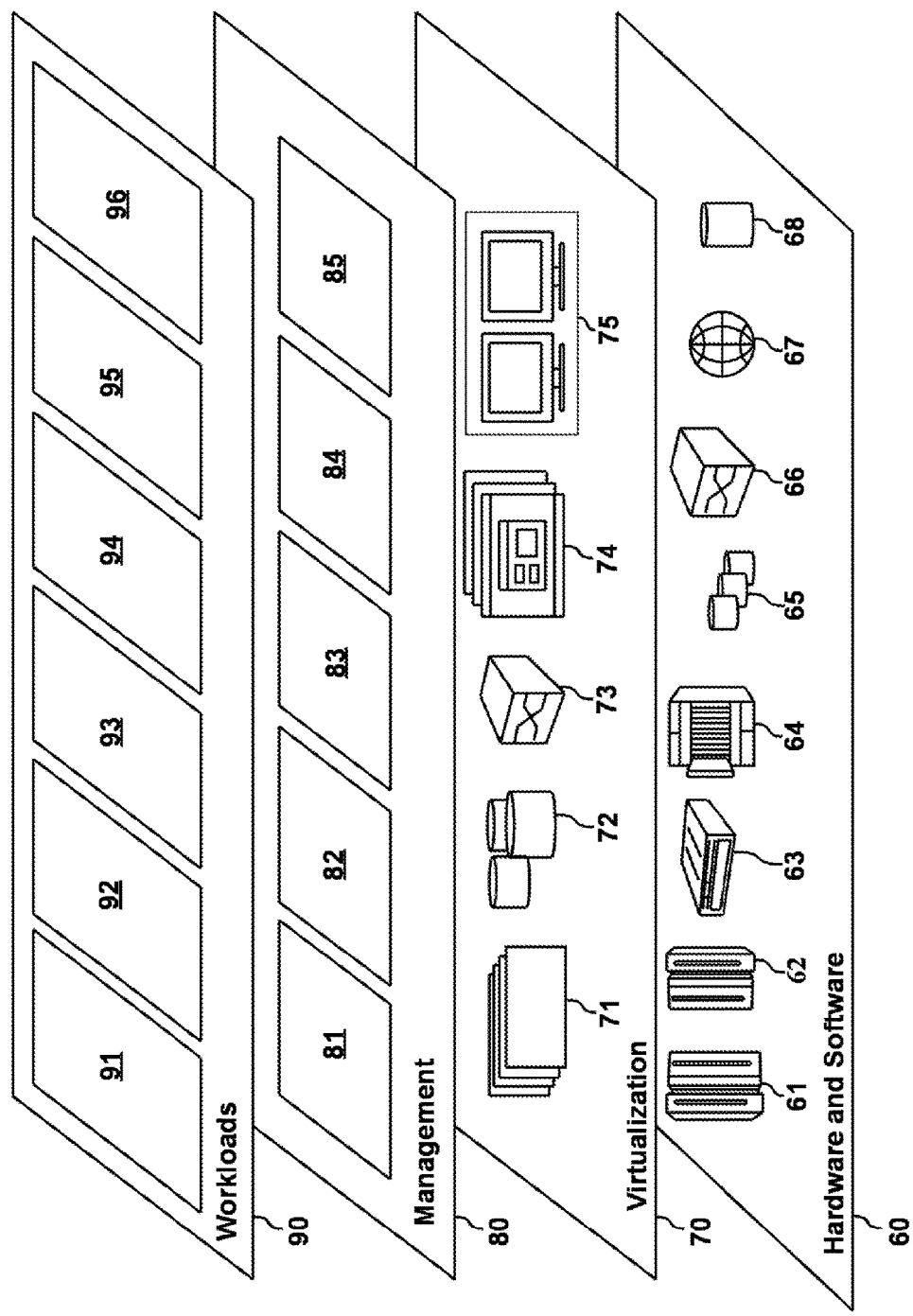
FIG. 9 depicts abstraction model layers according to various embodiments.

Turning now to FIGS. 8 and 9, it is to be understood that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The cloud model characteristics may include on-demand self-service, broad network access, resource pooling, rapid elasticity, and/or measured service. On-demand self-service is a characteristic in which a cloud consumer can unilaterally provision computing capabilities, such as server time and network storage, as needed automatically without requiring human interaction with the service's provider. Broad network access is a characteristic in which capabilities are available over a network and accessed through standard mechanisms that promote use by heterogeneous thin or thick client platforms (e.g., mobile phones, laptops, and personal digital assistants (PDAs)). Resource pooling is a characteristic in which the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity is a characteristic in which capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is a characteristic in which cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The cloud model Service Models may include Software as a Service (SaaS), Platform as a Service (PaaS), and/or Infrastructure as a Service (IaaS).

SaaS is a service model in which the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS is a service model in which the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. IaaS is a service model in which the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The cloud model Deployment Models may include private cloud, community cloud, public cloud, and/or hybrid cloud. Private cloud is a deployment model in which the cloud infrastructure is operated solely for an organization. It may be managed by the organization or a third party and may exist on-premises or off-premises. Community cloud is a deployment model in which the cloud infrastructure is shared by several organizations and supports a specific community that has shared concerns (e.g., mission, security requirements, policy, and compliance considerations). It may be managed by the organizations or a third party and may exist on-premises or off-premises. Public cloud is a deployment model in which the cloud infrastructure is made available to the general public or a large industry group and is owned by an organization selling cloud services. Hybrid cloud is a deployment model in which the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 40 is depicted. As shown, cloud computing environment 40 includes one or more cloud computing nodes 10 with which local computing devices used by cloud consumers, such as, for example, PDA or cellular telephone 44A, desktop computer 44B, laptop computer 44C, and/or automobile computer system 44N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 8 are intended to be illustrative only and that cloud computing nodes 10 and cloud computing environment 40 can communicate with any type of computerized device over any type of network and/or network addressable connection (e.g., using a web browser).

Referring now to FIG. 9, a set of functional abstraction layers provided by cloud computing environment 40 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 50 includes hardware and software components. Examples of hardware components include: mainframes 51; RISC (Reduced Instruction Set Computer) architecture based servers 52; servers 53; blade servers 54; storage devices 55; and networks and networking components 56. In some embodiments, software components include network application server software 57 and database software 58. The hardware and software components of hardware and software layer 50 may serve as the underlying computing components on which cloud computing functions are executed in response to receipt of a request for performance of a function and/or service offered as a part of cloud computing environment 40 such as, for example, the API endpoint de-parameterization described above.

Virtualization layer 60 provides an abstraction layer from which the following examples of virtual entities may be provided: virtual servers 61; virtual storage 62; virtual networks 63, including virtual private networks; virtual applications and operating systems 64; and virtual clients 65. These virtual entities may enable a subscriber to cloud computing environment 40 to interact indirectly with the hardware and software components of hardware and software layer 50 indirectly via virtual layer 60 without having a specific knowledge of, or interacting directly with, hardware and software layer 50. For example, a plurality of subscribers may interact with virtualization layer 60 to respectively access a corresponding plurality of virtual servers 61 and virtual storage 62 that all exist as separate threads, instances, partitions, etc. on a single server 52 and storage device 55, respectively. In such a scenario, virtualization layer 60 may cause each virtual server 61 and virtual storage 62 to appear to each subscriber as a dedicated and seamless computing and storage device, while enabling efficient operation of the hardware and software components of hardware and software layer 50 by reducing a potential for redundancy of components.

In one example, management layer 80 may provide the functions described below via an abstraction layer such that a subscriber to cloud computing environment 40 may interact with virtualization layer 60 and/or hardware and software layer 50 indirectly via management layer 80 without having a specific knowledge of, or interacting directly with, virtualization layer 60 and/or hardware and software layer 50. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA. Management layer 80 enables a subscriber to cloud computing environment 40 to interact with cloud computing environment 40 through management layer 80 to perform tasks and functions (e.g., administrative tasks) separate from actual execution of functions in the cloud computing environment 40. For example, an administrator may request access to a certain amount of computing resources (e.g., as provided in virtualization layer 60 and/or hardware and software layer 50) in cloud computing environment 40 via management layer 80 without having a specific knowledge of, or interacting directly with, virtualization layer 60 and/or hardware and software layer 50.

Workloads layer 90 provides examples of functionality for which the cloud computing environment may be utilized. The workloads and functions illustrated in workloads layer 90 are merely exemplary workloads and functions that may be executed in cloud computing environment 40 at the request or direction of a subscriber to cloud computing environment 40, and are not limited to those explicitly recited herein. Examples of workloads and functions which may be provided from this layer include: mapping and navigation 91; software development and lifecycle management 92; virtual classroom education delivery 93; data analytics processing 94; transaction processing 95; and API endpoint de-parameterization 96. These workloads and functions of workloads layer 90 may be end-user applications that enable a subscriber to cloud computing infrastructure 40 to interact with any of management layer 80, virtualization layer 60, and/or hardware and software layer 50 indirectly via workloads layer 90 without having a specific knowledge of, or interacting directly with, any of management layer 80, virtualization layer 60, and/or hardware and software layer 50. In this manner, the subscriber and/or an end user who accesses cloud computing infrastructure 40 may not require any form of specialized knowledge relating to the composition or operation of any of management layer 80, virtualization layer 60, and/or hardware and software layer 50 to perform the workloads and functions of workloads layer 90. In such a scenario, the workloads and functions of workloads layer 90 are said to be abstracted from management layer 80, virtualization layer 60, and hardware and software layer 50 because workloads layer 90 hides the underlying operation of management layer 80, virtualization layer 60, and hardware and software layer 50 from the subscriber and/or end-user while still enabling the subscriber and/or end-user to indirectly interact with management layer 80, virtualization layer 60, and/or hardware and software layer 50 to receive the computer processing benefits thereof via workloads layer 90.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means+/−10 percent of the stated value or reference.

What is claimed is:

1. A computer program product comprising a computer readable storage medium having program instructions embodied therewith, the program instructions executable by a processor to cause the processor to:
access an application programming interface (API) endpoint;
log the access of the API endpoint in an API usage log;
analyze the API usage log to determine characteristics associated with the API endpoint;
de-parameterize the API endpoint according to the analysis of the API usage log to generate a modified API endpoint by removing at least some parameters of the API endpoint to form the modified API endpoint, wherein at least some of the parameters removed from the API endpoint were determined to be shared in common among a plurality of entries in the API usage log according to the analysis of the API usage log, and wherein at least some of the parameters removed from the API endpoint are summarized and included in the modified API endpoint;
generate a mapping of the modified API endpoint to the API endpoint; and
implement the modified API endpoint in a software application.

2. The computer program product of claim 1, wherein analyzing the API usage log to determine characteristics associated with the API endpoint comprises determining API endpoint usage patterns according to one or more rules.

3. The computer program product of claim 1, wherein analyzing the API usage log to determine characteristics associated with the API endpoint comprises determining an API endpoint frequency hit ratio.

4. The computer program product of claim 1, wherein de-parameterizing the API endpoint according to the analysis of the API usage log to generate the modified API endpoint comprises implementing a machine learning process to remove the parameters from the API endpoint according to learned data relating to previously modified API endpoints.

5. The computer program product of claim 1, wherein the mapping maps the API endpoint to the modified API endpoint and at least one additional modified API endpoint that varies from the modified API endpoint.

6. The computer program product of claim 1, wherein implementing the modified API endpoint in the software application comprises providing access to an electronic resource described by the API endpoint in response to access of the modified API endpoint by the software application.

7. A computer-implemented method, comprising:
accessing an application programming interface (API) endpoint;
logging the access of the API endpoint in an API usage log;
analyzing the API usage log to determine characteristics associated with the API endpoint;
de-parameterizing the API endpoint according to the analysis of the API usage log to generate a modified API endpoint by removing at least some parameters of the API endpoint to form the modified API endpoint, wherein at least some of the parameters removed from the API endpoint were determined to be shared in common among a plurality of entries in the API usage log according to the analysis of the API usage log, and wherein at least some of the parameters removed from the API endpoint are summarized and included in the modified API endpoint;
generating a mapping of the modified API endpoint to the API endpoint; and
implementing the modified API endpoint in a software application.

8. The computer-implemented method of claim 7, wherein analyzing the API usage log to determine characteristics associated with the API endpoint comprises determining API endpoint usage patterns according to one or more rules.

9. The computer-implemented method of claim 7, wherein analyzing the API usage log to determine characteristics associated with the API endpoint comprises determining an API endpoint frequency hit ratio.

10. The computer-implemented method of claim 9, wherein the API endpoint frequency hit ratio is determined according to at least one of a maximum hit ratio, a most recently used API endpoint, or a round-robin.

11. The computer-implemented method of claim 7, wherein de-parameterizing the API endpoint according to the analysis of the API usage log to generate the modified API endpoint comprises implementing a machine learning process to remove the parameters from the API endpoint according to learned data relating to previously modified API endpoints.

12. The computer-implemented method of claim 7, wherein the mapping maps the API endpoint to the modified API endpoint and at least one additional modified API endpoint that varies from the modified API endpoint.

13. A system, comprising:
a server comprising a processor configured to access an electronic resource via an application programming interface (API) endpoint;
a data store coupled to the server and configured to log electronic resource accesses made by the server utilizing API endpoints;

a log analyzer coupled to the data store and configured to analyze a API usage log of the data store to determine characteristics associated with the API endpoints;

an API modification candidate generator coupled to the log analyzer and configured to de-parameterize the API endpoint according to the analysis of the API usage log to generate a modified API endpoint by removing at least some parameters of the API endpoint to form the modified API endpoint, wherein at least some of the parameters removed from the API endpoint were determined to be shared in common among a plurality of entries in the API usage log according to the analysis of the API usage log, and wherein at least some of the parameters removed from the API endpoint are summarized and included in the modified API endpoint; and a mapping generator coupled to the API modification candidate generator and the server and configured to generate a mapping of the modified API endpoint to the API endpoint, wherein the server is further configured to, via the processor, implement the modified API endpoint in a software application.

14. The system of claim 13, wherein the log analyzer, the API modification candidate generator, and the mapping generator are each implemented by the processor.

15. The system of claim 13, wherein the log analyzer analyzing the API usage log to determine characteristics associated with the API endpoint comprises determining API endpoint usage patterns according to one or more rules.

16. The system of claim 13, wherein the log analyzer analyzing the API usage log to determine characteristics associated with the API endpoint comprises determining an API endpoint frequency hit ratio.

17. The system of claim 16, wherein the API endpoint frequency hit ratio is determined according to at least one of a maximum hit ratio, a most recently used API endpoint, or a round-robin.

18. The system of claim 13, wherein the API modification candidate generator de-parameterizing the API endpoint according to the analysis of the API usage log to generate the modified API endpoint comprises implementing a machine learning process to remove the parameters from the API endpoint according to learned data relating to previously modified API endpoints.

19. The system of claim 13, wherein the mapping generator maps the API endpoint to the modified API endpoint and at least one additional modified API endpoint that varies from the modified API endpoint.

20. The system of claim 13, wherein the server implementing the modified API endpoint in the software application comprises providing access to the electronic resource described by the API endpoint in response to access of the modified API endpoint by the software application.

* * * * *